United States Patent
Salam et al.

(10) Patent No.: US 8,804,534 B2
(45) Date of Patent: Aug. 12, 2014

(54) INTERWORKING BETWEEN MPLS/IP AND ETHERNET OAM MECHANISMS

(75) Inventors: Samer M. Salam, Vancouver (CA); Thomas D. Nadeau, Hampton, NH (US); Luca Martini, Lakewood, CO (US); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1130 days.

(21) Appl. No.: 11/804,615

(22) Filed: May 19, 2007

(65) Prior Publication Data

US 2008/0285466 A1  Nov. 20, 2008

(51) Int. Cl.
*H04L 1/00* (2006.01)
*H04L 12/24* (2006.01)

(52) U.S. Cl.
CPC ....................................... *H04L 41/06* (2013.01)
USPC ........................................ 370/241.1; 370/242

(58) Field of Classification Search
None
See application file for complete search history.

(56) References Cited

U.S. PATENT DOCUMENTS

| | | |
|---|---|---|
| 5,331,637 A | 7/1994 | Francis et al. |
| 5,818,842 A | 10/1998 | Burwell et al. |
| 5,848,227 A | 12/1998 | Sheu |
| 6,055,364 A | 4/2000 | Speakman et al. |
| 6,073,176 A | 6/2000 | Baindur et al. |
| 6,078,590 A | 6/2000 | Farinacci et al. |
| 6,188,694 B1 | 2/2001 | Fine et al. |
| 6,301,244 B1 | 10/2001 | Huang et al. |
| 6,304,575 B1 | 10/2001 | Carroll et al. |
| 6,308,282 B1 | 10/2001 | Huang |
| 6,373,838 B1 | 4/2002 | Law et al. |
| 6,424,657 B1 | 7/2002 | Voit et al. |
| 6,430,621 B1 | 8/2002 | Srikanth et al. |
| 6,484,209 B1 | 11/2002 | Momirov |
| 6,502,140 B1 | 12/2002 | Boivie |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |

(Continued)

FOREIGN PATENT DOCUMENTS

| WO | WO 2007/031002 A | 3/2007 |
|---|---|---|
| WO | WO 2008/089370 | 7/2008 |

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

(Continued)

*Primary Examiner* — Rhonda Murphy
(74) *Attorney, Agent, or Firm* — Baker Botts L.L.P.

(57) ABSTRACT

In one embodiment, a method includes receiving, by a provider edge (PE) device, a transport layer status message indicative of a defect on a pseudowire (PW) running across a core of a service provider (SP) network. The status message is translated to a service layer message indicative of the defect. The service layer message is then transmitted across an access domain of the SP network.

19 Claims, 8 Drawing Sheets

(56) References Cited

U.S. PATENT DOCUMENTS

| | | |
|---|---|---|
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,882,643 B1 | 4/2005 | Mauger et al. |
| 6,892,309 B2 | 5/2005 | Richmond et al. |
| 6,954,436 B1 | 10/2005 | Yip |
| 7,009,983 B2 | 3/2006 | Mancour |
| 7,016,351 B1 | 3/2006 | Farinacci et al. |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,345,991 B1 | 3/2008 | Shabtay et al. |
| 7,408,936 B2 | 8/2008 | Ge et al. |
| 7,466,697 B1 * | 12/2008 | Raz et al. ............ 370/389 |
| 7,466,703 B1 | 12/2008 | Arunachalam et al. |
| 7,693,078 B2 * | 4/2010 | Gonda ............ 370/241.1 |
| 7,961,737 B2 * | 6/2011 | Ge et al. ............ 370/395.53 |
| 2002/0032780 A1 | 3/2002 | Moore et al. |
| 2002/0087721 A1 | 7/2002 | Sato et al. |
| 2002/0156612 A1 | 10/2002 | Schulter et al. |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0107382 A1 * | 6/2004 | Doverspike et al. ............ 714/4 |
| 2004/0125809 A1 | 7/2004 | Jeng |
| 2004/0133619 A1 * | 7/2004 | Zelig et al. ............ 709/200 |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0228291 A1 | 11/2004 | Huslak et al. |
| 2004/0233891 A1 | 11/2004 | Regan |
| 2004/0264364 A1 | 12/2004 | Sato |
| 2005/0007951 A1 | 1/2005 | Lapuh et al. |
| 2005/0025143 A1 | 2/2005 | Chen et al. |
| 2005/0030975 A1 | 2/2005 | Wright et al. |
| 2005/0044265 A1 | 2/2005 | Vinel et al. |
| 2005/0063397 A1 | 3/2005 | Wu et al. |
| 2005/0068972 A1 | 3/2005 | Burns et al. |
| 2005/0089047 A1 | 4/2005 | Ould-Brahim et al. |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157751 A1 | 7/2005 | Rabie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0239445 A1 | 10/2005 | Karaogguz et al. |
| 2005/0249124 A1 * | 11/2005 | Elie-Dit-Cosaque et al. 370/242 |
| 2005/0286503 A1 | 12/2005 | Oda et al. |
| 2006/0007867 A1 | 1/2006 | Elie-Dit-Cosaque et al. |
| 2006/0092847 A1 | 5/2006 | Mohan et al. |
| 2006/0098607 A1 | 5/2006 | Zeng |
| 2006/0126496 A1 | 6/2006 | Filsfils et al. |
| 2006/0182037 A1 | 8/2006 | Chen et al. |
| 2006/0248277 A1 | 11/2006 | Pande |
| 2006/0285500 A1 | 12/2006 | Booth |
| 2006/0285501 A1 | 12/2006 | Damm |
| 2007/0076719 A1 | 4/2007 | Allan et al. |
| 2007/0133564 A1 * | 6/2007 | Chun et al. ............ 370/395.51 |
| 2008/0049763 A1 * | 2/2008 | Damm et al. ............ 370/400 |
| 2008/0144657 A1 * | 6/2008 | Li ............ 370/466 |
| 2008/0172497 A1 * | 7/2008 | Mohan et al. ............ 709/249 |

OTHER PUBLICATIONS

Pseudo-Wire Edge-To Edge (PWE3) Working Group, Simon Delord, Uecomm; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, CH, No. 2, No. 2, Oct. 1, 2005, XP015042128 ISSN: 0000-0004 abstract p. 10, paragraph 3 Section 3.1.1.1. on pp. 12-13.

* cited by examiner

Triggers
1: Receive *LDP PW Status Message* with Local PSN-facing PW (egress) Transmit Fault code
2: Receive *LDP PW Status Message* with Local Attachment Circuit (ingress) Receive Fault code
3: Receive *LDP PW Label Release* Message
4: Receive *LDP PW Label Withdraw* Message
5: Release *LDP PW Status Message* with Pseudo Wire Not Forwarding code
6: Receive *LDP PW Status Message* with Local PSN-facing PW (ingress) Receive Fault code
7: Receive *LDP PW Status Message* with Local Attachment Circuit (egress) Transmit Fault code
8: BFD Detection Time expires before receiving any BFD Messages from upstream PE.
9: Receive M (a configurable number) BFD Control Message from upstream PE within a designated time interval T.
10: Receive *LDP PW Status Message* with Pseudo Wire Forwarding code
11: PW moves to UP state (bidirectional)
12: Lower Layer (LL) Fault
13: Receive CFM AIS on the Ethernet AC
    OR
    CCDB entry timeout on the Ethernet AC
    OR
    Ethernet AC changes port state to Down
    OR
    Ethernet AC changes line protocol state to Down
14: Receive CFM RDI on the Ethernet AC
15: Receive CFM RDI Clear on the Ethernet AC
16: Ethernet AC changes port state to Admin Down

FIG. 7

Actions:
A:
- Start or continue sending CFM AIS on AC.
- Stop sending CFM CC messages.
B:
- Send *LDP PW Status Message* with Local PSN-facing PW (ingress) Receive Fault code.
- Start or continue sending CFM AIS on AC.
- Stop sending CFM CC messages.
C:
- Start or continue sending CFM RDI on AC.
D:
Clear CFM AIS on AC (stop sending AIS and start sending CCs)
Send *LDP PW Status Message* with *Pseudo Wire Forwarding* code.
E:
Clear CFM RDI on AC.
F:
Suppress all service level alarms
G:
Send LDP PW Status Message with Local Attachment Circuit (ingress) Receive Fault code
H:
Send LDP PW Status Message with Local Attachment Circuit (egress) Transmit Fault code
I:
Send *LDP PW Status Message* with Pseudo Wire Forwarding code.
J:
Send LDP label Withdraw and suppress all service level alarms

INTERWORKING BETWEEN MPLS/IP AND ETHERNET OAM MECHANISMS

TECHNICAL FIELD

This disclosure relates generally to the field of digital computer networks and fault detection mechanisms.

BACKGROUND

Service providers (SPs) are increasingly using Multi-protocol Label Switching (MPLS)/Internet Protocol (IP) networks for delivering various types of services. In SP networks consisting of an MPLS/IP core attached to one or more Ethernet Access Domains, with pseudowires (PWs) utilized for transporting data traffic over the core, occurrence of faults within the core may cause end-to-end service disruption. (A PW is a tunnel established between two provider edge nodes to transport Layer 2 packet data units (PDUs) across a packet switched network (PSN).) Thus, as more legacy networks migrate to the use of MPLS for transport, the role of MPLS Operations, Administration, and Maintenance (OAM) network fault, performance, data, and diagnosis functions, has become increasingly important.

A number of different OAM mechanisms have been developed for fault detection and isolation in MPLS networks. For example, Virtual Circuit Connectivity Verification (VCCV) is a known mechanism for identifying OAM packets at the egress of a PW. VCCV is thus useful in detecting failures in the forwarding plane on the egress of the MPLS PW. Label Distribution Protocol (LDP) status messages and the MPLS Label Switched Path (LSP) Ping tool provide the capability for detecting and isolating failures in the data plane, and for verifying the data plane against the MPLS control plane. Various Ethernet service OAM mechanisms, such as the Ethernet IEEE 802.1ag Connectivity Fault Management (CFM), Link Layer OAM (IEEE 802.3ah OAM), and Ethernet Local Management Interface (E-LMI) (Metro Ethernet Forum Technical Specification 16), also enable a user to detect faults within Ethernet domains.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 7 illustrates an example listing of triggers for the finite state machine of FIG. 6.

FIG. 8 illustrates an example listing of actions for the finite state machine of FIG. 6.

DESCRIPTION OF EXAMPLE EMBODIMENTS

In the following description specific details are set forth, such as device types, system configurations, communication methods, etc., in order to provide a thorough understanding of the present invention. However, persons having ordinary skill in the relevant arts will appreciate that these specific details may not be needed to practice the embodiments described.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

A customer edge (CE) device, as that term is used in the present disclosure, refers to customer node or device connecting to the service provider. A provider edge (PE) device refers to a device or node that is used to connect CE devices to the service. For example, a user-facing provider edge (u-PE) device is commonly used to connect CE devices to the service. An attachment circuit (AC) is the customer connection to the service provider network. An AC may be a physical port, or a virtual port, and may be any transport technology (e.g., Frame Relay (FR), Asynchronous Transfer Mode (ATM), Ethernet, etc.) A network-facing provider edge (n-PE) is a node or device that acts as a gateway between the SP core (e.g., MPLS) and edge domain, which may be MPLS or Ethernet. Furthermore, it should be understood that for the purposes of OAM protocol interworking, a pseudowire (PW) may comprise either a single hop or a multi-hop spanning several operational domains or network segments.

A "defect", in the context of the present application, refers to any sort of network failure, which may include anything from a complete loss of connectivity to a intermittent loss of connectivity, or a loss of quality (from partial to complete). A forward defect denotes a type of defect wherein a node or network device is unable to receive packets. Conversely, a reverse defect denotes a type of defect wherein a node or device is unable to send packets. A forward defect may be considered to be a superset of a reverse defect case, since in order to reliably determine whether it has transmitted correctly, a node needs to receive back an acknowledgment from the destination or receiver device. Therefore, an occurrence of a forward defect may be thought of as superseding a reverse defect.

In one embodiment, an interworking mechanism is provided that enables the translation of events and communication of fault information between Ethernet OAM and pseudowire (PW) OAM protocols/tools. The interworking involves mapping remote failure indications for forward defects signaled by targeted LDP (in PW status messages) to Connectivity Fault Management (CFM) Alarm Indication Signal (AIS) messages, and locally detecting forward defects through CFM connectivity check (CC) messages or VCCV-Bidirectional Forwarding Detection (BFD) protocol timeouts and notifying the remote peer device via PW status messages.

(BFD is a simple "hello" mechanism that provides short-duration detection of failures in a path between adjacent forwarding engines. BFD can provide failure detection on any kind of path between systems, including virtual circuits and tunnels, and can be used to detect MPLS LSP data plane failures.)

For reverse defects, remote notifications in the form of LDP PW status messages received by the PE device triggers generation of CFM Remote Defect Indication (RDI) messages. In other words, the PE device at the far end of the MPLS core is configured to convert a PW status message to a CFM RDI forwarded to the CE device. Any reverse defects locally detected in the receipt of CFM RDI cause LDP PW status messages to be generated and transmitted to the remote end. Thus, in one embodiment, interworking between Ethernet CFM (IEEE 802.1ag/ITU-T Y.1731) and PW OAM (VCCV-BFD/targeted LDP) is provided.

Although an example for a method of exchanging alarm conditions and reporting service status between an MPLS network (used to deliver Layer 2 Virtual Private Network (L2VPN) services) and an Ethernet bridged access domain is described, it should be understood that other embodiments may include different network topologies, such as MPLS core network connected with other operational domains, e.g., Ethernet access domain on one end and an MPLS access domain on the other, etc. Additionally, although various examples are described that include PWs running across an MPLS core network, it should be understood that in other embodiments PWs may also run over other types of networks, including IP, Layer 2 Tunnel Protocol Version 3 (L2TPv3), etc.), and other technologies which may, in the future, include Ethernet.

Figure 1:
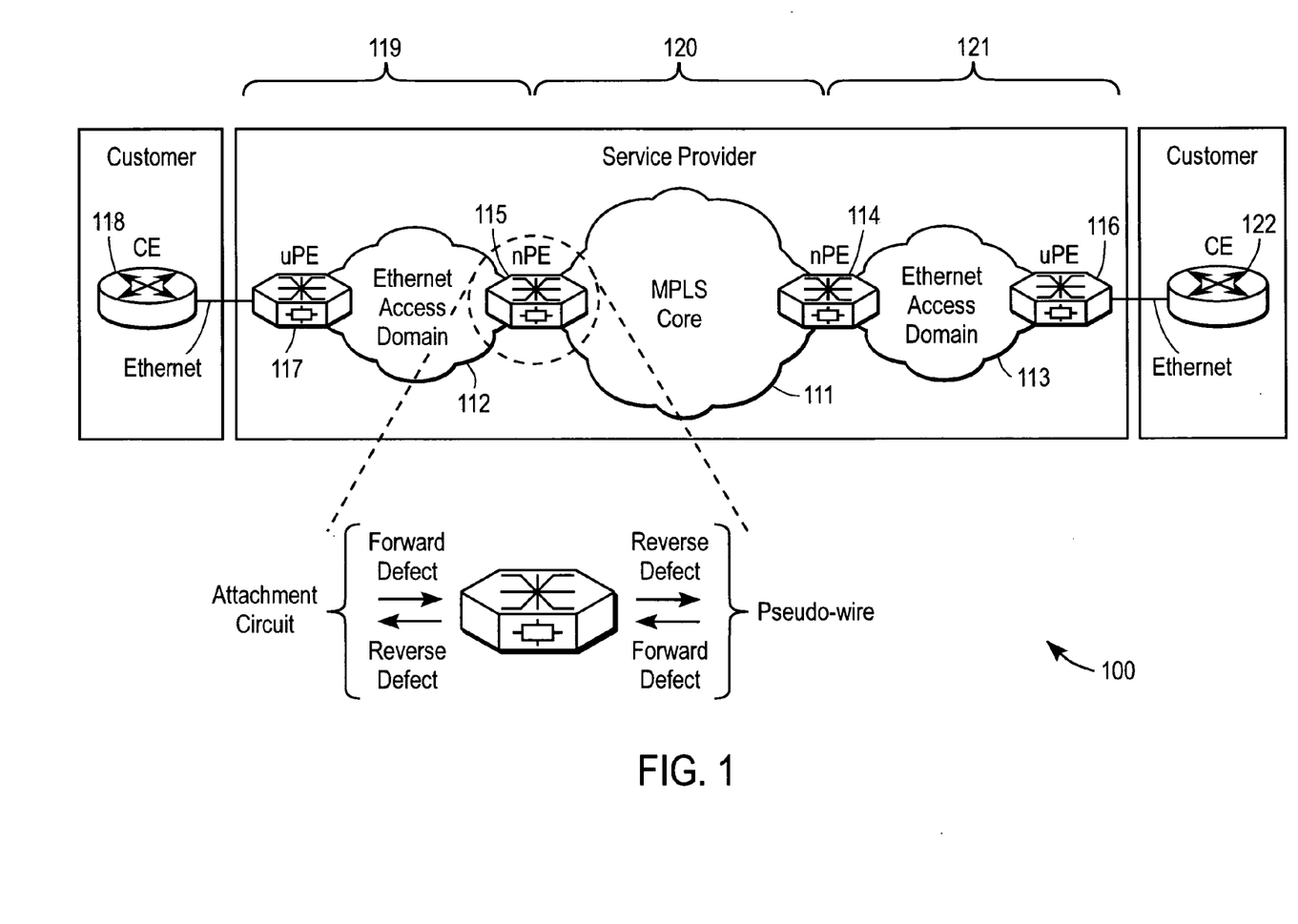
FIG. 1 illustrates an example packet-based network with end-to-end service between two customer sites.

FIG. 1 illustrates an example packet-based network 110 with end-to-end service between two customer sites shown by CE devices 118 & 122. CE device 118 is connected with u-PE device 117 of Ethernet access domain 112, whereas CE device 122 is connected with u-PE device 116 of Ethernet access domain 113. Ethernet access domains 112 and 113 are connected over MPLS core network 111 via n-PE devices 115 & 114, respectively. Thus, segments 119-121 of the SP network which connects CE devices 118 & 122 respectively comprise Ethernet access domain 112, MPLS core network 111, and Ethernet access domain 113.

In the example embodiment shown, n-PE devices 114 and 115 are configured to map the status of internal core network 111 to the external Ethernet OAM mechanisms, and vice-versa. This operation is represented in FIG. 1 by the exploded view of n-PE device 115, which shows both the forward defect and reverse defect arrow indications for both the attachment circuit and pseudowire connections. In other words, the transport type is bidirectional so that n-PE device 115 may transmit packets in one direction (e.g., from Ethernet access domain 112) and receive packets from the other direction (e.g., from MPLS network 111). In one embodiment, MPLS network 111 runs its own PW OAM mechanism, e.g. VCCV/BFD.

VCCV may run across the MPLS core to provide an in-band OAM mechanism that exercises the data path of each PW. That is, monitoring and troubleshooting of pseudowires is accomplished using VCCV. In general, VCCV may be used to construct an in-band control channel for a specific pseudowire. The control channel traffic is treated and processed by the underlying transport network in the same manner as data traffic. Some VCCV modes—BFD in particular—can be used to convey the operational status of the far-end of the pseudowire (e.g., n-PE 114) to the local-end (e.g., n-PE 115). That is, the BFD with status indication mode of VCCV can be used to convey the up/down status of one or more far-end attachment circuits that utilize the pseudowire associated with the control channel in consideration.

The status of a PW may also be signaled to a PE device using the Status Type-Length-Value (TLV) defined in LDP. (All LDP messages have a common structure that uses a TLV encoding scheme.) The Status TLV (first defined in RFC3036, section 3.4.6) has been extended in RFC4447 to include additional status codes to be used for PWs. In one embodiment, when an attachment circuit to a PE device encounters an error, the PE device uses a PW Notification Message to send a single "wild card" status message, using a PW FEC TLV with only the group ID set, to denote this change in status for all affected PW connections. (The FEC identifies the set of IP packets which may be mapped to a corresponding LSP.) This status message typically contains either the PW FEC TLV with only the group ID set, or the Generalized FEC TLV with only the PW Grouping ID TLV. As discussed above, the Group ID field of the PW FEC element, or the PW Grouping ID TLV used for the Generalized ID FEC element, may be used to send a status notification for all arbitrary sets of PWs.

It should be noted that although the LDP Status Message indicates the TLV based on the FEC/PW, since only one access circuit is associated with a pseudowire, there is a one-to-one mapping, which means that Extended Local Management Interface (E-LMI) or CFM mappings may only receive a single affected circuit to notify.

It should be understood that for the implementations described herein, the status of a PW is conveyed using only one mechanism. For example, if LDP is used to signal the PW, LDP is then also used to convey the far-end access circuits' status. VCCV can be used to augment this by testing the data plane (with status information kept locally). In other words, in the example of FIG. 1, u-PE 117 may be running VCCV with BFD non-status or LDP ping mode (but not BFD with status indication) with u-PE 116. If there is a loss of VCCV messages at u-PE 117, then u-PE 117 may convey that status to its local access circuits immediately, and convey that same status to remote u-PE 116 using LDP Status Messages as described above. However, that status is not included in any BFD status codes. Similarly, the u-PE 116 may listen for notifications via LDP Status Messages that triggers notification of the pseudowire failure to its locally attached circuits.

Access circuit status may be signaled to a far-end PE using the VCCV control channel in cases where LDP is not configured for signaling of the pseudowires. In such cases, PW failure or AC status detected locally may be signaled to the remote end using VCCV if the BFD with status messages mode has been signaled. The BFD status bits corresponding to the access circuits may be used to indicate the failure. In this embodiment, LDP Status Messages may not used in conjunction with the BFD with status messages mode.

It is appreciated that other embodiments may have a network topology with a u-PE device is attached directly to MPLS core network 111, with Ethernet being transported across the core via one or more pseudowires.

Figure 2:
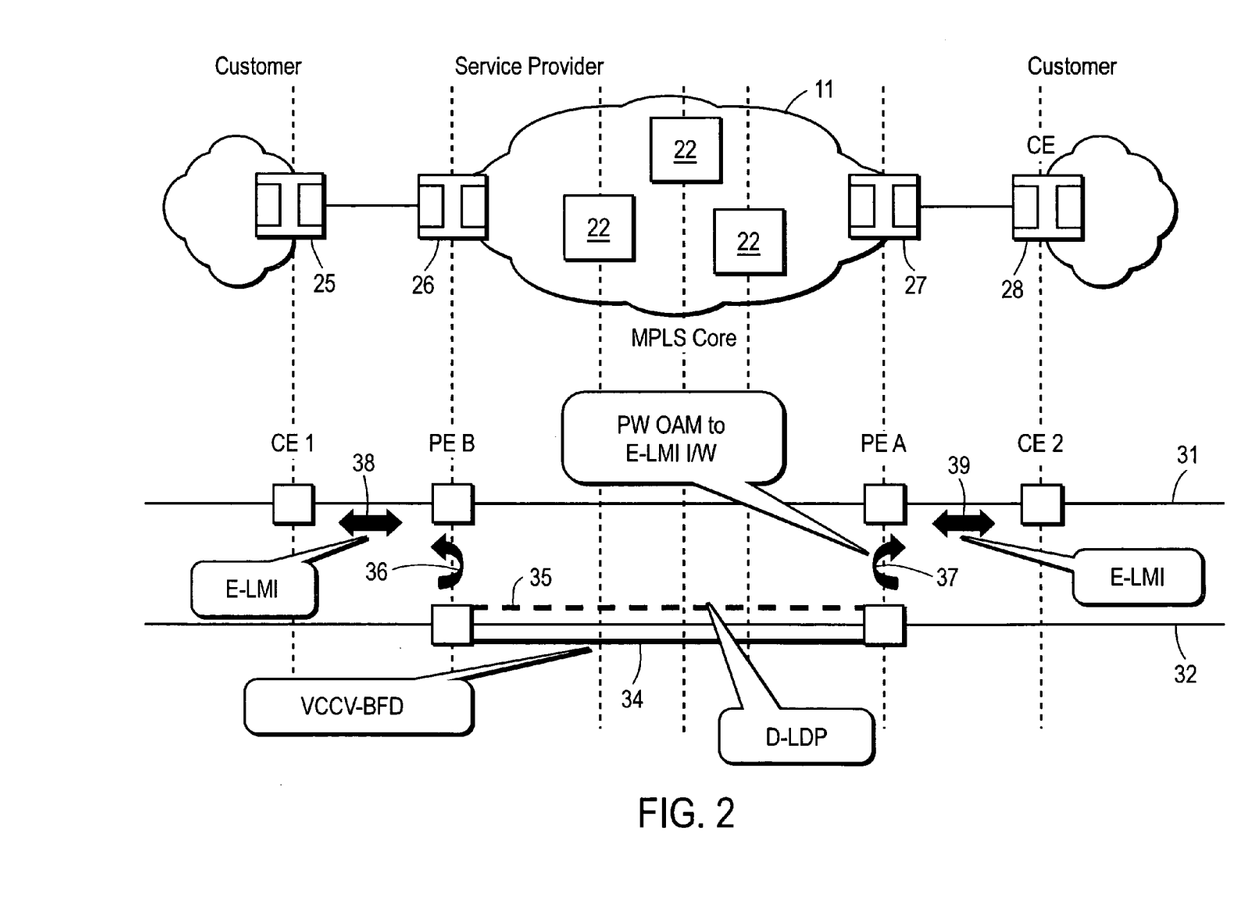
FIG. 2 illustrates an example network showing defect communication between service and transport layer OAM mechanisms.

FIG. 2 illustrates an example network showing defect communication between service and transport layer OAM mechanisms; specifically, the mapping of the defect state to E-LMI. In this example, end-to-end service is shown between CE devices 25 and 28 across a service provider network comprising MPLS core 11. PE devices 26 & 27 are shown respectively connected with CE devices 25 & 28. A plurality of intermediate provider nodes 22 are shown providing connectivity over MPLS core 11. Service layer OAM and transport layer OAM mechanisms are illustrated at the bottom of FIG. 2 by lines 31 and 32, respectively.

In this example, dashed line 35 illustrates Directed-LDP (D-LDP) running between PE devices 26 and 27 for defect notification. In addition, defect detection in the MPLS core is provided by VCCV-BFD running between PE devices 26 and 27, as shown by solid line 34. In this embodiment, PE devices 26 and 27 are configured with software (or hardware/firmware) components for communicating defects detected by PW OAM to E-LMI running between the PE devices and their respective CE devices. This interworking function is illustrated by curved arrows 36 and 37 depicted beneath the corresponding PE devices of service layer OAM line 31. For example, arrow 38 represents E-LMI between CE device 25 and PE device 26, whereas arrow 39 represents E-LMI between CE device 28 and PE device 27. (In this example, the service layer is hosting an Ethernet service.)

In the example of FIG. 2, a defect that is detected by VCCV-BFD or indicated by LDP state in the MPLS core is translated or mapped by a PE device to an E-LMI message forwarded over the customer link. For instance, in the case where the access circuit of PE device 26 shuts off or fails, LDP running across MPLS core 11 can send an in-line status message to PE device 27 indicating that the access circuit is down or is otherwise unavailable. Upon receiving the LDP message, PE device 27 translates the transport layer LDP message to a service layer E-LMI OAM message indicating that defect status to CE device 28. In other words, if a defect is detected in the transport layer of the MPLS core, then defect notification is translated (i.e. mapped) by the PE device and sent to the service layer. If a defect is detected in the service layer, a defect notification is translated to the PE device and sent to the core so that it may be transmitted across to the service layer at the other side (the other customer site).

Figure 3:
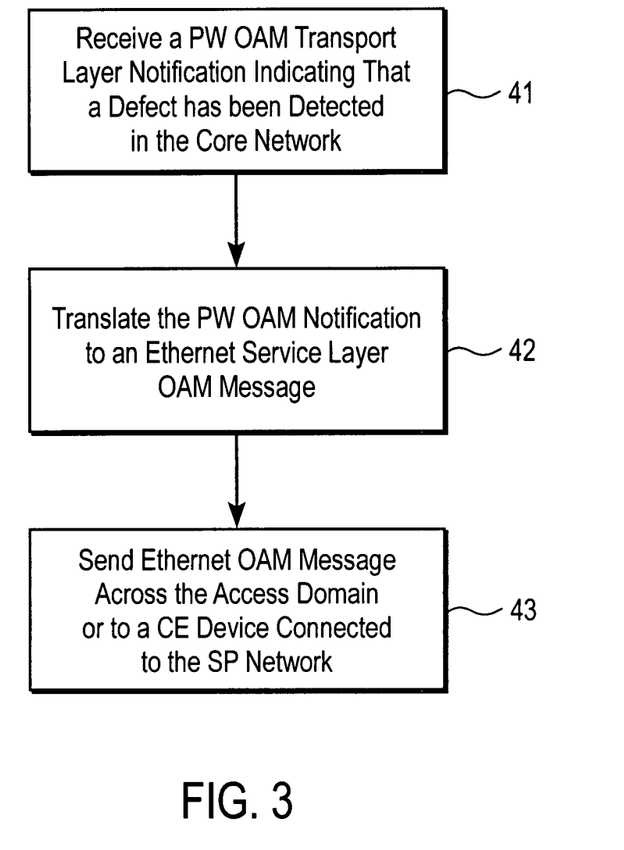
FIG. 3 illustrates an example method of operation for a provider edge device.

FIG. 3 illustrates an example method of operation for a provider edge device. The process starts with the PE device receiving a PW OAM transport layer notification that indicates a defect has been detected in the MPLS core network (block 41). In response, the PE device translates the transport layer OAM defect notification message to an Ethernet service layer OAM message. This is shown occurring at block 42 in FIG. 3. The Ethernet OAM message is then sent or forwarded across the access domain, where, for instance, it may be received by a CE device connected to the SP network (block 43).

Figure 4:
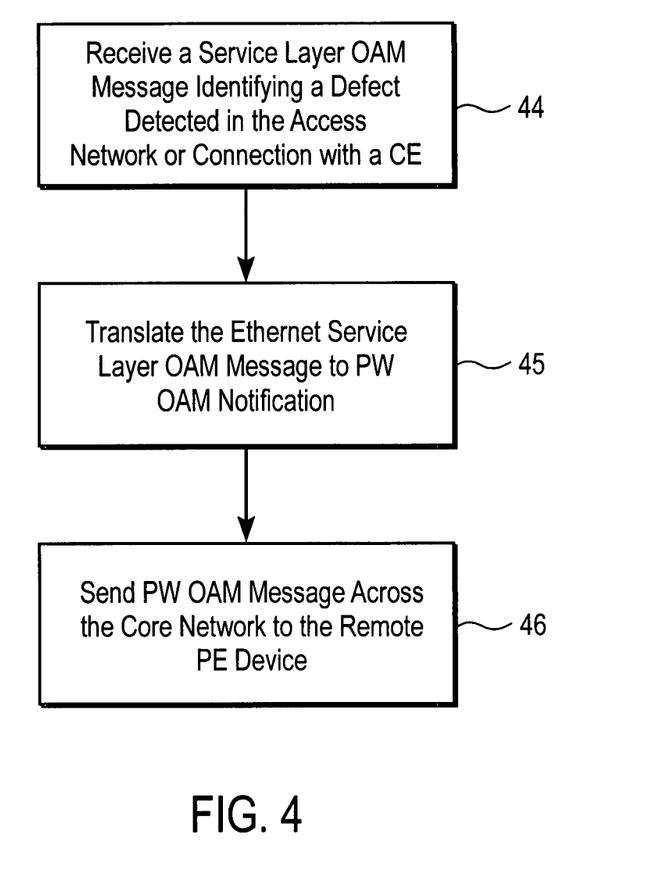
FIG. 4 illustrates another example method of operation for a provider edge device.

FIG. 4 illustrates another example method of operation for a provider edge device. In this case, instead of detecting a defect in the transport layer across the MPLS core, the method of FIG. 4 begins with the PE device receiving a service layer OAM message indicating that a defect has been detected in the access network or in a connection with a CE device. This is shown by block 44. In response to the defect notification, the PE device translates the service layer OAM message to a transport layer PW OAM message (block 45). The PE device then sends this PW OAM message across the core network to a remote end peer device (block 46).

Figure 5:
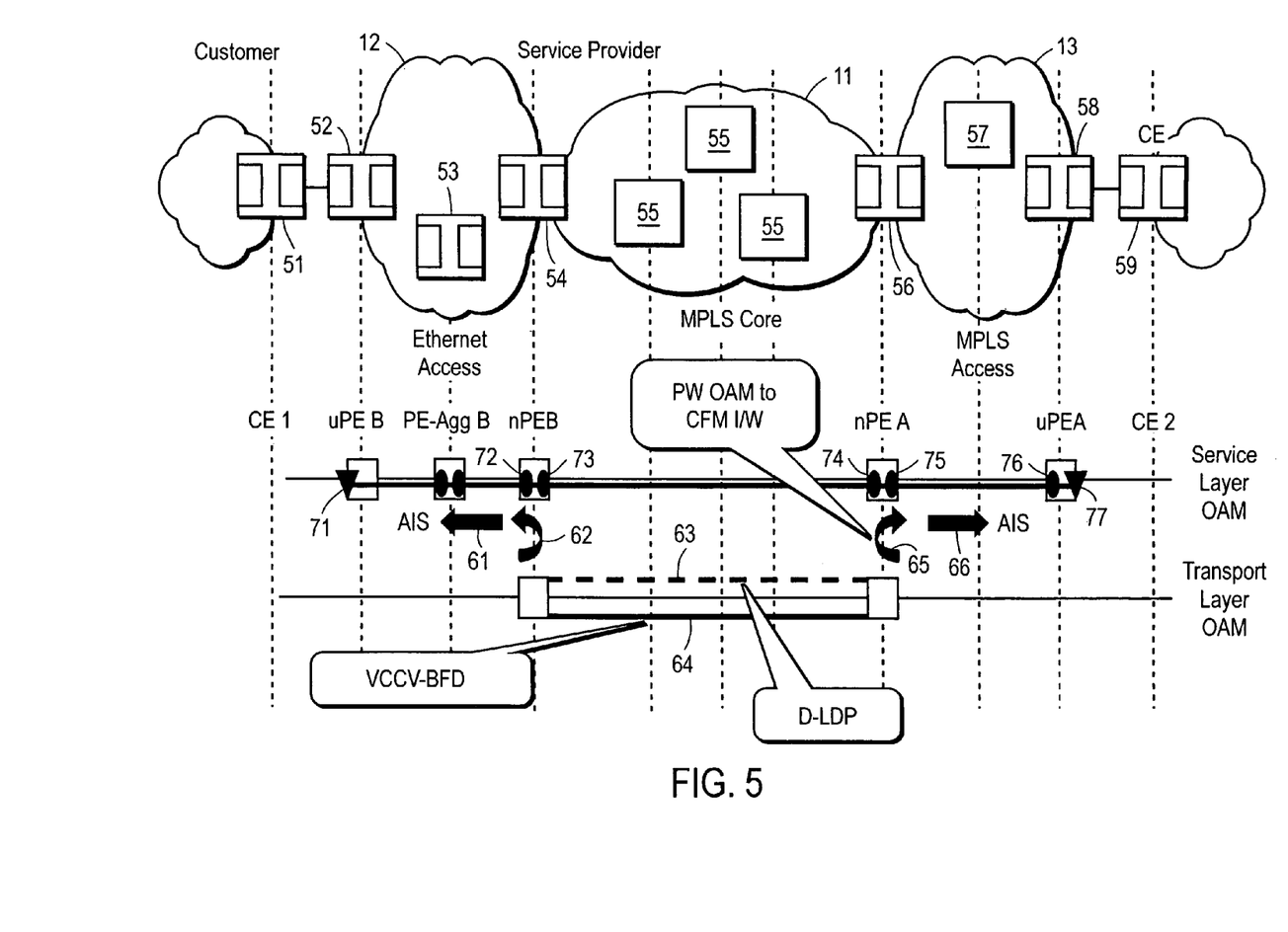
FIG. 5 illustrates an example network showing mapping of the defect space in the SP core network to Ethernet access domains.

FIG. 5 illustrates an example network showing mapping of the defect space in a SP MPLS core network 11 to Ethernet access domains 12 & 13. In the embodiment shown, end-to-end service is shown between CE devices 51 and 59 across a service provider network comprising MPLS core 11, Ethernet access network 12, and MPLS access network 13. CE devices 51 & 59 are respectively shown connected with the SP network via connections to u-PE devices 52 & 58. MPLS core 11 includes n-PE devices 54 and 56 that respectively connect with access networks 12 and 13.

A plurality of intermediate provider nodes 55 are shown providing connectivity over MPLS core 11. Similarly, aggregation PE device 53 (PE-Agg) is shown providing connectivity between u-PE device 52 and n-PE device 54 in Ethernet access network 12. Intermediate node 57 connects u-PE device 58 and n-PE device 56 in MPLS access network 13. Service layer OAM and transport layer OAM mechanisms are illustrated by the horizontal lines extending across the bottom of FIG. 5. Dashed line 63 denotes D-LDP running between n-PE devices 54 & 56. Solid line 64 denotes VCCV (BFD mode) running between the n-PE nodes.

The upside-down triangles 71 & 72 represent maintenance endpoints (MEPs) respectively associated with u-PE devices 52 & 58. In accordance with the IEEE 802.1ag standard, a maintenance point at the edge of a domain is called a "maintenance endpoint." System administrators typically use MEPs to initiate and monitor CFM activity and report the results. A maintenance point inside a domain, and visible to a MEP, is referred to as a "maintenance intermediate point" (MIP). MIPs passively receive and respond to CFM frames initiated by MEPs. In FIG. 5, maintenance intermediate points are represented by ellipses within the PE devices. For example, in FIG. 5 MIPs 72 & 73 are associated with n-PE device 54, whereas MIPs 74 & 75 are shown as part of n-PE device 56.

In the example embodiment of FIG. 5, detection of a fault in one of the access networks triggers a CFM AIS alarm that is translated by the n-PE device to a PW status message sent across the core. At the remote side of the core, another n-PE device translates the PW status to a CFM AIS that is then sent over the remote access network. At the same time, the OAM status of MPLS core 11 is conveyed via automated event translation to the access circuit's native Ethernet CFM. Note that in the example of FIG. 5, the transport layer to service layer translation is shown by curved arrows 62 & 65 associated with n-PE devices 54 & 56, respectively. AIS alarm messages associated with Ethernet and MPLS access networks 12 & 13 are shown by arrows 61 & 66, respectively.

Forward defects that affect a device's ability to receive traffic may be notified using CFM AIS. Reverse defects that impact the device's ability to transmit traffic may be notified using RDI messages. Ethernet CFM Continuity Check (CC) messages, per IEEE 802.1ag, may be used for proactive connectivity monitoring and defect detection within Ethernet access domains. For purposes of the interworking function, VCCV/BFD may be utilized for PW defect detection and continuity checking.

It is appreciated that OAM status may be measured at the ends of the pseudowire, and also within MPLS core 11. The PW provides the signaling and data encapsulation needed to transport the Ethernet traffic across MPLS core 11. The status of the PW may be determined in a number of ways, but is primarily divided to the control and data plane status. The control plane status may be gathered using the signaling protocol in use, e.g., LDP and the known extensions that facilitate both single and multi-hop PWs. As described above, the data plane of the PW may be verified using VCCV, LSP Ping, or LSP Traceroute, or similar mechanisms.

Practitioners in the art will appreciate that from the perspective of a designated n-PE device, a defect can occur in one of three possible locations: in the local Ethernet access network; within the MPLS core, or in the remote access network. The locality of the defect has implications on the method by which the designated n-PE device detects the defect or is notified of its occurrence. For instance, defects in the local Ethernet access network may be detected by the n-PE device using native Ethernet OAM mechanisms (e.g., CFM or 802.3ah) whereas faults within the remote access network are communicated to the designated n-PE device by the remote n-PE device using some form of MPLS control channel.

Defects within the MPLS core can either be detected locally by the n-PE device, or that n-PE device can be notified of their occurrence from the remote n-PE device.

Figure 6:
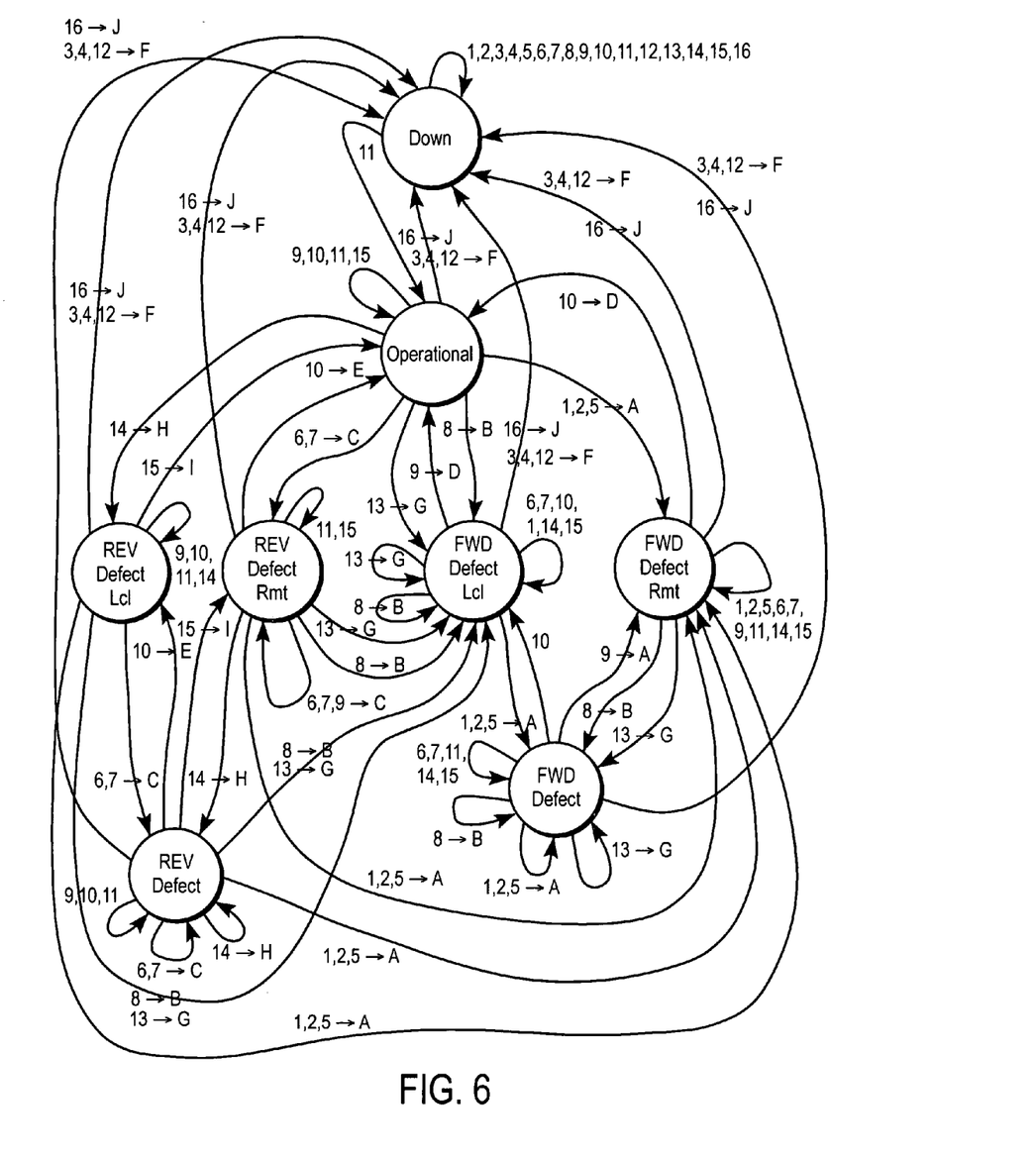
FIG. 6 illustrates an example finite state machine that provides pseudowire OAM to CFM interworking.

In one embodiment, the interworking function shown by arrows 62 and 65 in FIG. 5 may be performed using a finite state machine associated with or configured within the n-PE device. FIG. 6 illustrates an example finite state machine (FSM) that provides pseudowire OAM to CFM interworking for LDP-signaled Ethernet over MPLS (EoMPLS) PWs. That is, the example of FIG. 6 captures the mechanism for protocol interworking between VCCV-BFD, directed LDP, and Ethernet CFM, and illustrates how message and event translation is performed. FIG. 7 illustrates an example listing of triggers for state transitions of the FSM of FIG. 6, whereas FIG. 8 is an example listing of actions (denoted by the capital letters) for the FSM of FIG. 6.

Each of the various states is shown by an ellipse, with the state transitions being shown by the arrows. The Down state designates that the PW is not established, and hence, the services completely down. The Operational state designates that the service is operational, and that no alarm conditions are present. The Forward Defect Local state designates that the device has locally detected a forward defect. Conversely, the Forward Defect Remote state designates that the device has been informed by a remote peer of a forward defect. The Forward Defect state is a superset of the Forward Defect Local and Forward Defect Remote states. An n-PE device enters the Forward Defect state when the combination of events leading to having it enter the above two states occurs in tandem. An n-PE exits this state when those events are cleared, thereby reverting back to one of the initiating two states. An n-PE device also exits this state when the PW is torn down.

The Reverse Defect Local state designates that the device has locally detected a reverse defect. Similarly, the Reverse Defect Remote state designates that the device has been informed by the remote peer of the occurrence of a reverse defect. The Reverse Defect state is a superset of the Reverse Defect Local and Reverse Defect Remote states. An n-PE device enters this state when the combination of events leading to having it enter the above two states occur in tandem. An n-PE exits the Reverse Defect state when those events are cleared, thereby reverting back to one of the initiating two states. An n-PE device also exits this state when the PW is torn down.

Figure 9:
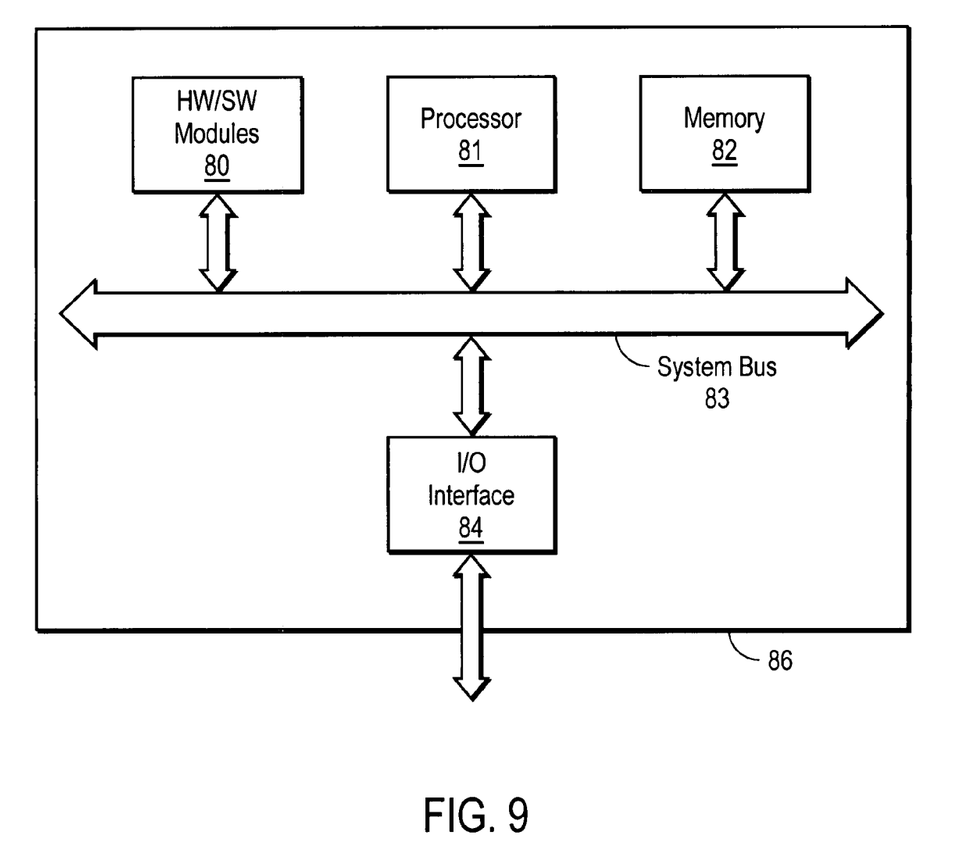
FIG. 9 illustrates an example network device or node.

FIG. 9 illustrates an example network device or node 86, which comprises a number of basic subsystems including a processor subsystem 81, a main memory 82 and an input/output (I/O) subsystem 84. Data may be transferred between main memory ("system memory") 82 and processor subsystem 81 over a memory bus (not shown), and between the processor and I/O subsystems over a system bus 83. Examples of the system bus may include the conventional lightning data transport (or hyper transport) bus and the conventional peripheral component [computer] interconnect (PCI) bus. Node 86 may also comprise other hardware units/modules 80 coupled to system bus 83 for performing additional functions. (The term "module" is to be understood as being synonymous with hardware devices and computer-executable software code, programs or routines.) Processor subsystem 81 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
receiving, by a provider edge (PE) device, a transport layer status message indicative of a defect on a pseudowire (PW) running across a Multi-Protocol Label Switching/Internet Protocol (MPLS/IP) core of a service provider (SP) network;
identifying the defect at least in part by examining the transport layer status message;
selecting, based at least in part on the defect, a service layer message indicative of the defect, the service layer message comprising an Ethernet Operations Administration, and Maintenance (OAM) message; and
sending, by the PE device, the service layer message to a customer edge (CE) device over an Ethernet access domain of the SP network.

2. The method of claim 1 further comprising receiving, by the PE device, a Virtual Circuit Connectivity Verification (VCCV)/Bidirectional Forwarding Detection (BFD) transport layer status notification.

3. The method of claim 1 wherein the receiving of the transport layer status message comprises receiving a Label Distribution Protocol (LDP) status message from an upstream PE device, the LDP status message indicating a reverse defect.

4. The method of claim 1 wherein the receiving of the transport layer status message comprises receiving a Label Distribution Protocol (LDP) status message from an upstream PE device, the LDP status message indicating a forward defect.

5. The method of claim 1 wherein the sending of the service layer message comprises sending an Ethernet Local Management Interface (E-LMI) message on an attachment circuit of the access domain.

6. The method of claim 1 wherein the sending of the service layer message comprises sending a Connectivity Fault Management (CFM) Alarm Indication Signal (AIS) message on an attachment circuit of the access domain.

7. The method of claim 1 further comprising stopping the sending of Connectivity Fault Management (CFM) connectivity check messages on an attachment circuit of the access domain.

8. A method comprising:
   detecting, by a provider edge (PE) device, a Connectivity Fault Management (CFM) Alarm Indication Signal (AIS) message on an attachment circuit of an Ethernet access domain of a Service Provider (SP) network using a native Ethernet Operations, Administration, and Maintenance (OAM) mechanism; the CFM AIS message being indicative of a local defect;
   identifying the local defect at least in part by examining the CFM AIS message;
   selecting, based at least in part on the local defect, a transport layer pseudowire (PW) status message indicative of the local defect, the transport layer PW status message comprising a Label Distribution Protocol (LDP) status message; and
   sending, by the PE device, the LDP status message to a remote PE device over a Multi-protocol Label Switching (MPLS) control channel of the SP network.

9. The method of claim 8 wherein the sending of the LDP status message comprises sending the LDP status message with a pseudowire forwarding code to a remote PE device.

10. The method of claim 8 further comprising clearing the AIS message on the attachment circuit of the Ethernet access domain.

11. The method of claim 8 wherein the native Ethernet OAM mechanism comprises an Ethernet Connectivity Fault Management (CFM) mechanism.

12. The method of claim 8 wherein the native Ethernet OAM mechanism comprises an IEEE 802.3ah link OAM message.

13. The method of claim 8 wherein the native Ethernet OAM mechanism comprises an Ethernet Local Management Interface (E-LMI) message.

14. An apparatus comprising:
   a first port to receive a Connectivity Fault Management (CFM) Alarm Indication Signal (AIS) message indicative of a fault on an attachment circuit in an Ethernet access domain of a service provider (SP) network;
   a second port for connection to a Multi-Protocol Label Switching/Internet Protocol (MPLS/IP) core of the SP network; and
   at least one processor operable to:
      identify the fault at least in part by examining the CFM AIS message;
      generate, based at least in part on the fault, a Label Distribution Protocol (LDP) pseudowire (PW) status message indicative of the fault;
      send the LDP PW status message via the second port to a remote peer device responsive to receiving the CFM AIS message;
      generate an Ethernet CFM Remote Defect Indicator (RDI) message responsive to a different LDP pseudowire (PW) status message indicative of a defect received at the second port; and
      transmit the Ethernet CFM RDI message across the Ethernet access domain.

15. The apparatus of claim 14 wherein the LDP PW status message is sent over a PW of the MPLS core.

16. The apparatus of claim 14 wherein the at least one processor is further operable to clear the CFM AIS message on the attachment circuit.

17. An apparatus comprising:
   a first port to receive a pseudowire (PW) transport layer status message transmitted over a Multi-Protocol Label Switching/Internet Protocol (MPLS/IP) core of a service provider (SP) network, the PW transport layer status message being indicative of a remote defect;
   at least one processor operable to:
      identify the remote defect at least in part by examining the PW transport layer status message;
      generate, based at least in part on the remote defect, an Ethernet Operations, Administration, and Maintenance (OAM) service layer message; and
      transmit the Ethernet OAM service layer message across an Ethernet access domain;
   a second port to receive an Ethernet OAM service layer message indicative of a local defect in the Ethernet access domain of the SP network; and
   wherein the at least one processor is further operable to:
      identify the local defect at least in part by examining the PW Ethernet OAM service layer message;
      generate, based at least in part on the local defect, a Label Distribution Protocol (LDP) status message; and
      transmit the LDP status message to a remote peer over the MPLS/IP core.

18. The apparatus of claim 17 wherein the Ethernet OAM service layer message comprises an Ethernet Local Management Interface (E-LMI) message.

19. The apparatus of claim 17 wherein the Ethernet OAM service layer message comprises a Connectivity Fault Management (CFM) message.

* * * * *